United States Patent
Loehr et al.

(10) Patent No.: US 10,609,589 B2
(45) Date of Patent: Mar. 31, 2020

(54) DETERMINING DATA AVAILABLE FOR TRANSMISSION

(71) Applicant: Motorola Mobility LLC, Chicago, IL (US)

(72) Inventors: Joachim Loehr, Wiesbaden (DE); Prateek Basu Mallick, Langen (DE); Ravi Kuchibhotla, Clarendon Hills, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 0 days.

(21) Appl. No.: 15/984,192

(22) Filed: May 18, 2018

(65) Prior Publication Data

US 2018/0352556 A1  Dec. 6, 2018

Related U.S. Application Data

(60) Provisional application No. 62/514,719, filed on Jun. 2, 2017.

(51) Int. Cl.
   *H04L 1/18* (2006.01)
   *H04L 12/26* (2006.01)
   (Continued)

(52) U.S. Cl.
   CPC ....... *H04W 28/0205* (2013.01); *H04L 1/1835* (2013.01); *H04L 1/1874* (2013.01);
   (Continued)

(58) Field of Classification Search
   CPC ... H04L 1/08–1692; H04L 5/003–0046; H04L 5/0058; H04L 5/0064;
   (Continued)

(56) References Cited

U.S. PATENT DOCUMENTS

2012/0163315 A1* 6/2012 Govindappa ......... H04L 1/1874 370/329
2017/0013498 A1* 1/2017 Yi ..................... H04W 72/0413 370/328

(Continued)

OTHER PUBLICATIONS

Ericsson, "UL Split in Dual Connectivity", 3GPP TSG-RAN WG2 #97bis, Tdoc R2-1702749, Apr. 3-7, 2017, pp. 1-4. (Year: 2017).*

(Continued)

*Primary Examiner* — Timothy J Weidner
(74) *Attorney, Agent, or Firm* — Kunzler Bean & Adamson

(57) ABSTRACT

Apparatuses, methods, and systems are disclosed for determining data available for transmission. One method includes associating a packet data convergence protocol entity with a first radio link control entity and a second radio link control entity belonging to two different cell groups. The method includes determining an amount of data available for transmission, the amount of data available for transmission including packet data convergence protocol data and radio link control data pending for initial transmission in the first radio link control entity and the second radio link control entity. The method includes comparing the amount of data available for transmission with a threshold. The method includes submitting the packet data convergence protocol data to a first radio link control entity in response to the amount of data available for transmission being below the threshold.

21 Claims, 7 Drawing Sheets

(51) Int. Cl.
| | |
|---|---|
| *H04L 12/801* | (2013.01) |
| *H04L 12/835* | (2013.01) |
| *H04W 28/02* | (2009.01) |
| *H04W 28/06* | (2009.01) |
| *H04W 72/08* | (2009.01) |
| *H04W 72/10* | (2009.01) |
| *H04W 72/14* | (2009.01) |
| *H04W 76/27* | (2018.01) |
| *H04W 80/02* | (2009.01) |
| *H04W 88/06* | (2009.01) |
| *H04W 92/10* | (2009.01) |

(52) U.S. Cl.
CPC .............. *H04L 43/16* (2013.01); *H04L 47/14* (2013.01); *H04L 47/29* (2013.01); *H04L 47/30* (2013.01); *H04W 28/0278* (2013.01); *H04W 28/06* (2013.01); *H04W 72/085* (2013.01); *H04W 72/10* (2013.01); *H04W 72/14* (2013.01); *H04W 76/27* (2018.02); *H04W 80/02* (2013.01); *H04W 88/06* (2013.01); *H04W 92/10* (2013.01)

(58) Field of Classification Search
CPC . H04L 5/0098; H04L 43/16; H04L 47/10–14; H04L 47/25–266; H04L 47/29; H04L 47/30; H04L 47/33–365; H04L 47/40; H04L 47/41; H04L 47/70–829; H04L 69/18–324; H04L 69/04; H04L 169/40; H04L 5/0071–0098; H04L 69/40; H04W 8/22–245; H04W 16/14–225; H04W 24/02–10; H04W 28/02–26; H04W 36/02–04; H04W 36/14–385; H04W 48/02; H04W 48/06; H04W 48/18; H04W 56/0005–0025; H04W 72/02–14; H04W 74/002–0891; H04W 76/10–38; H04W 80/02; H04W 84/18–22; H04W 88/06; H04W 88/10; H04W 92/02; H04W 92/04; H04W 92/10; H04W 92/16–20
See application file for complete search history.

(56) References Cited

U.S. PATENT DOCUMENTS

| | | | |
|---|---|---|---|
| 2018/0220326 A1* | 8/2018 | Nagasaka | H04W 28/0278 370/230 |
| 2018/0310202 A1* | 10/2018 | Lohr | H04W 28/065 370/329 |
| 2019/0132897 A1* | 5/2019 | Pradas | H04W 76/15 370/329 |

OTHER PUBLICATIONS

Ericsson (Rapporteur), "UL Split in Dual Connectivity", 3GPP TSG-RAN WG2 #98, Tdoc R2-1704381, May 15-19, 2017, pp. 1-12. (Year: 2017).*
PCT/US2018/033527, "Notification of Transmittal of the International Search Report and the Written Opinion of the International Searching Authority, or the Declaration", International Searching Authority, dated Aug. 24, 2018, pp. 1-13.
Ericsson, "UL Split in Dual Connectivity", 3GPP TSG-RAN WG2 #97bis, Tdoc R2-1702749, Apr. 3-7, 2017, pp. 1-4.
Ericsson (Rapporteur), "UL Split in Dual Connectivity", 3GPP TSG-RAN WG2 #98, Tdoc R2-1704381, May 15-19, 2017, pp. 1-12.

* cited by examiner

| PDCP BUFFER | RLC$_{MCG}$ (PREPROCESSED DATA) | RLC$_{SCG}$ (PREPROCESSED DATA) | EVENTS |
| --- | --- | --- | --- |
| 0 | 0 | 0 | INITIALIZED |
| 0 | 100 | 0 | DATA ARRIVAL IN PDCP (100), 100 UNITS ROUTED TO RLC$_{MCG}$ |
| 0 | 100 | 50 | DATA ARRIVAL IN PDCP (50), 50 UNITS ROUTED TO RLC$_{SCG}$ |
| 0 | 20 | 50 | UL GRANT FOR MCG (80), 80 UNITS TRANSMITTED FROM RLC$_{MCG}$ |
| 0 | 20 | 0 | UL GRANT FOR SCG (50), 50 UNITS TRANSMITTED FROM RLC$_{SCG}$ |
| 0 | 100 | 20 | DATA ARRIVAL IN PDCP (100), 80 UNITS ROUTED TO RLC$_{MCG}$ AND 20 UNITS ROUTED TO RLC$_{SCG}$ |
| 420 | 100 | 50 | DATA ARRIVAL IN PDCP (500), 30 UNITS ROUTED TO RLC$_{SCG}$ |

FIG. 6

DETERMINING DATA AVAILABLE FOR TRANSMISSION

CROSS-REFERENCE TO RELATED APPLICATIONS

This application claims priority to U.S. Patent Application Ser. No. 62/514,719 entitled "THRESHOLD BASED UL SPLIT BEARER OPERATION" and filed on Jun. 2, 2017 for Joachim Loehr which is incorporated herein by reference in its entirety.

FIELD

The subject matter disclosed herein relates generally to wireless communications and more particularly relates to determining data available for transmission.

BACKGROUND

The following abbreviations are herewith defined, at least some of which are referred to within the following description: Third Generation Partnership Project ("3GPP"), Fifth Generation ("5G"), Authentication Authorization and Accounting ("AAA"), Positive-Acknowledgment ("ACK"), Acknowledged Mode ("AM"), Access and Mobility Management Function ("AMF"), Access Server ("AS"), Authentication Server Function ("AUSF"), Bandwidth ("BW"), Cell Group ("CG"), Cell Radio Network Temporary Identifier ("C-RNTI"), Common Physical Downlink Control Channel ("C-PDCCH"), Dedicated Control Channel ("DCCH"), Downlink ("DL"), Demodulation Reference Signal ("DMRS"), Domain Name System ("DNS"), Enhanced Mobile Broadband ("eMBB"), Evolved Node B ("eNB"), Enhanced Subscriber Identification Module ("eSIM"), Equipment Identity Register ("EIR"), Evolved Packet Core ("EPC"), European Telecommunications Standards Institute ("ETSI"), E-UTRAN Radio Access Bearer ("E-RAB"), Evolved-Universal Terrestrial Radio Access Network ("E-UTRAN"), Frequency Division Duplex ("FDD"), Frequency Division Multiple Access ("FDMA"), Fully Qualified Domain Name ("FQDN"), Global System For Mobile Communications Association ("GSMA"), Hybrid Automatic Repeat Request ("HARQ"), Home Policy Control Function ("H-PCF"), Home Public Land Mobile Network ("HPLMN"), Identity or Identifier or Identification ("ID"), International Mobile Equipment Identity ("IMEI"), International Mobile Subscriber Identity ("IMSI"), Internet-of-Things ("IoT"), Layer 2 ("L2"), Logical Channel Identifier ("LCD"), Logical Channel Prioritization ("LCP"), Long Term Evolution ("LTE"), Multiple Access ("MA"), Medium Access Control ("MAC"), Master Cell Group ("MCG"), Modulation Coding Scheme ("MCS"), Mobile Country Code ("MCC"), Mobile Network Code ("MNC"), Machine Type Communication ("MTC"), Master Information Block ("MIB), Mobility Management ("MM"), Mobility Management Entity ("MME"), Non-Access Stratum ("NAS"), Narrowband ("NB"), Negative-Acknowledgment ("NACK") or ("NAK"), Network Entity ("NE"), Next Generation Node B ("gNB"), New Radio ("NR"), Orthogonal Frequency Division Multiplexing ("OFDM"), Over-the-Air ("OTA"), Physical Broadcast Channel ("PBCH"), Policy Control Function ("PCF"), Packet Data Convergence Protocol ("PDCP"), Protocol Data Unit ("PDU"), Public Land Mobile Network ("PLMN"), Primary Synchronization Signal ("PSS"), Pointer ("PTR"), Quality of Service ("QoS"), Random Access Channel ("RACH"), Radio Access Technology ("RAT"), Resource Block ("RB"), Radio Link Control ("RLC"), Radio Link Failure ("RLF"), Radio Network Layer ("RNL"), Radio Resource Control ("RRC"), Radio Resource Management ("RRM"), Radio Access Network ("RAN"), Reference Signal Received Power ("RSRP"), Reference Signal Received Quality ("RSRQ"), Receive ("RX"), Secondary Cell Group ("SCG"), Secondary Synchronization Signal ("SSS"), Service Data Unit ("SDU"), Sequence Number ("SN"), Single Carrier Frequency Division Multiple Access ("SC-FDMA"), Subscriber Management Function ("SMF"), Signal-to-Noise Ratio ("SNR"), Subscriber Identity Module ("SIM"), System Information Block ("SIB"), Sidelink ("SL"), Shared Channel ("SCH"), Synchronization Signal ("SS"), Subscription Concealed Identifier ("SUCI"), Subscription Permanent Identifier ("SUPI"), Timing Advance Group ("TAG"), Tracking Area ("TA"), Time Division Duplex ("TDD"), Transport Network Layer ("TNL"), Transmission Time Interval ("TTI"), Transmit ("TX"), Unified Data Management ("UDM"), User Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane Function ("UPF"), Ultra-Reliable Low-Latency Communication ("URLLC"), Universal Subscriber Identity Module ("USIM"), Visited Policy Control Function ("V-PCF"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, a certain amount of data may be available for transmission. In such networks, various portions of the data may be transmitted over one or more radio link control entities.

BRIEF SUMMARY

Methods for determining data available for transmission are disclosed. Apparatuses and systems also perform the functions of the apparatus. In one embodiment, the method includes associating a packet data convergence protocol entity with a first radio link control entity and a second radio link control entity belonging to two different cell groups. In certain embodiments, the method includes determining an amount of data available for transmission, the amount of data available for transmission including packet data convergence protocol data and radio link control data pending for initial transmission in the first radio link control entity and the second radio link control entity. In various embodiments, the method includes comparing the amount of data available for transmission with a threshold. In some embodiments, the method includes submitting the packet data convergence protocol data to a first radio link control entity in response to the amount of data available for transmission being below the threshold.

In one embodiment, the first radio link control entity is configured by radio resource control signaling. In a further embodiment, the method includes indicating an amount of packet data convergence protocol data to a medium access control entity associated with the first radio link control entity for buffer status reporting in response to the amount of data available for transmission being below the threshold. In certain embodiments, the packet data convergence protocol data includes data stored in a packet data convergence protocol layer. In various embodiments, the method includes indicating zero to a medium access control entity associated with a second radio link control entity as the amount of packet data convergence protocol data for buffer status reporting in response to the amount of data available for transmission being below the threshold. In some embodiments, the method includes submitting the packet data convergence protocol data to either the first radio link control entity or a second radio link control entity in response to the amount of data available for transmission being greater than or equal to the threshold. In certain embodiments, the method includes indicating the packet data convergence protocol data to a medium access control entity associated with the first radio link control entity and to a medium access control entity associated with a second radio link control entity for buffer status reporting in response to the amount of data available for transmission being greater than or equal to the threshold.

In various embodiments, the method includes receiving at least one uplink grant. In some embodiments, the method includes, in response to receiving the at least one uplink grant, transmitting data to at least one base unit that transmitted the at least one uplink grant. In certain embodiments, the at least one uplink grant includes one uplink grant and the at least one base unit includes one base unit. In various embodiments, the at least one uplink grant includes two uplink grants and the at least one base unit includes two base units. In certain embodiments, the threshold includes a first threshold and a second threshold. In various embodiments, the first threshold corresponds to prioritized data. In some embodiments, the second threshold corresponds to non-prioritized data.

In certain embodiments, the method includes receiving a configuration message indicating the first radio link control entity associated with a first base unit of multiple radio link control entities associated with multiple base units to use for uplink transmissions. In various embodiments, the method includes receiving a reconfiguration message indicating to switch from using the first radio link control entity for uplink transmissions corresponding to the first base unit to use a second radio link control entity of the multiple radio link control entities for uplink transmissions corresponding to a second base unit. In various embodiments, the method includes, in response to receiving the reconfiguration message, performing a reestablishment of the first radio link control entity. In some embodiments, the method includes, in response to receiving the reconfiguration message, flushing a transmission buffer corresponding to the first radio link control entity and resetting transmission state variables corresponding to the first base unit. In certain embodiments, the method includes using a first base unit of multiple base units as a default base unit for uplink transmissions. In various embodiments, the method includes receiving a switch message indicating to switch from using the first base unit for uplink transmissions to use a second base unit of the multiple base units for uplink transmissions.

An apparatus for determining data available for transmission, in one embodiment, includes a processor that: associates a packet data convergence protocol entity with a first radio link control entity and a second radio link control entity belonging to two different cell groups; determines an amount of data available for transmission, the amount of data available for transmission including packet data convergence protocol data and radio link control data pending for initial transmission in the first radio link control entity and the second radio link control entity; compares the amount of data available for transmission with a threshold; and submits the packet data convergence protocol data to a first radio link control entity in response to the amount of data available for transmission being below the threshold.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 6 is a schematic block diagram illustrating one embodiment of PDCP buffering.

DETAILED DESCRIPTION

Figure 1:
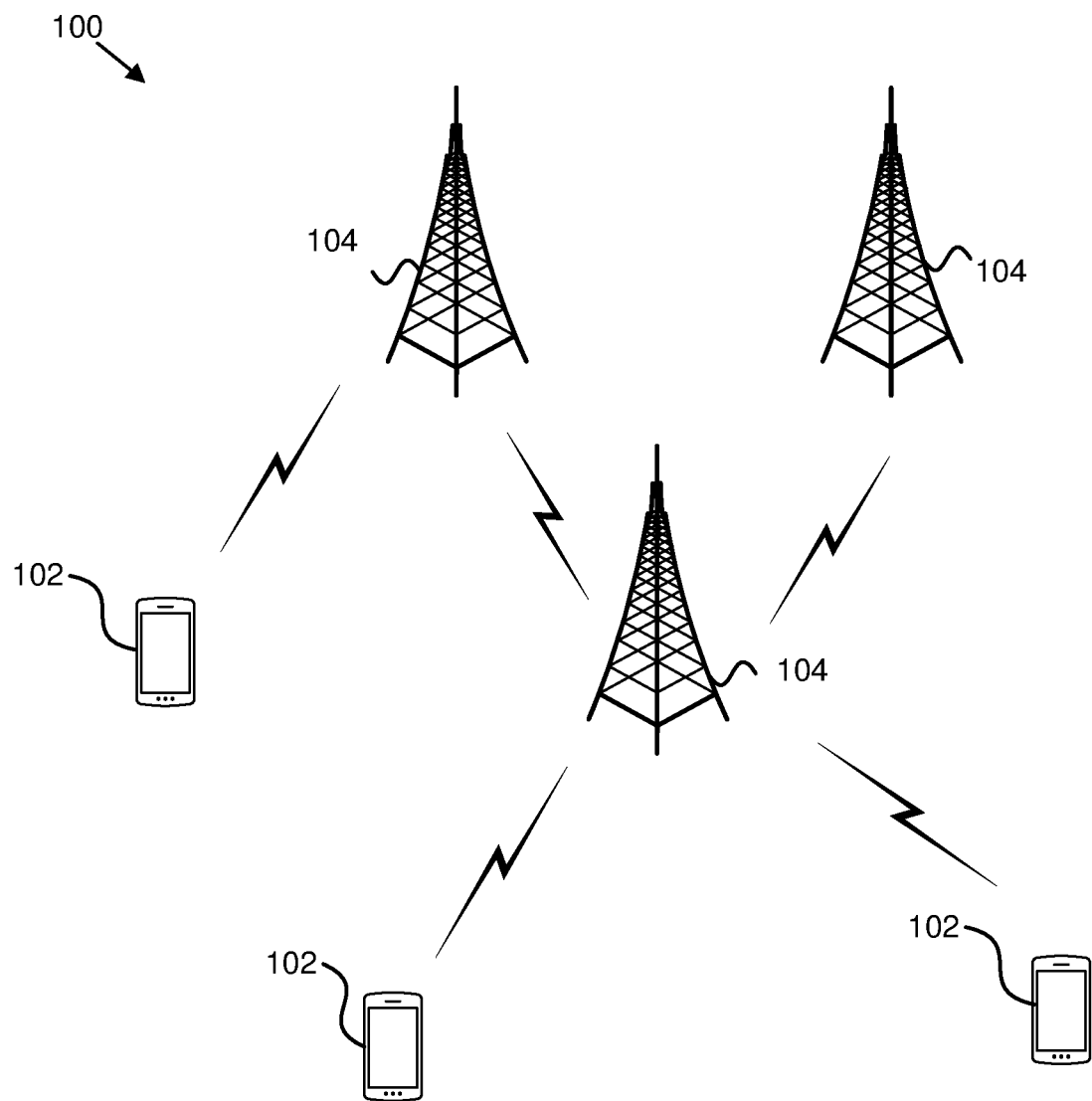
FIG. 1 is a schematic block diagram illustrating one embodiment of a wireless communication system for determining data available for transmission.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining data available for transmission. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base unit, a base station, a Node-B, an eNB, a gNB, a Home Node-B, a relay node, a device, a network device, an infrastructure device, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. In some embodiments, a network unit 104 may include one or more of the following network components an eNB, a gNB, an AMF, a DB, an MME, a PCF, a UDR, a UPF, a serving gateway, and/or a UDM.

In one implementation, the wireless communication system 100 is compliant with the NR/5G protocols or LTE protocols specified by 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In certain embodiments, a remote unit 102 may be used to associate a packet data convergence protocol entity with a first radio link control entity and a second radio link control entity belonging to two different cell groups. In various embodiments, the remote unit 102 may be used to determine an amount of data available for transmission. In such embodiments, the amount of data available for transmission may include packet data convergence protocol data and radio link control data pending for initial transmission in the first radio link control entity and the second radio link control entity. In various embodiments, the remote unit 102 may be used to compare the amount of data available for transmission with a threshold. In some embodiments, the remote unit 102 may be used to submit the packet data convergence protocol data to a first radio link control entity in response to the amount of data available for transmission being below the threshold. Accordingly, a remote unit 102 may be used for determining data available for transmission. In certain embodiments, a network unit 104 may perform substantially the same functions performed by the remote unit 102.

Figure 2:
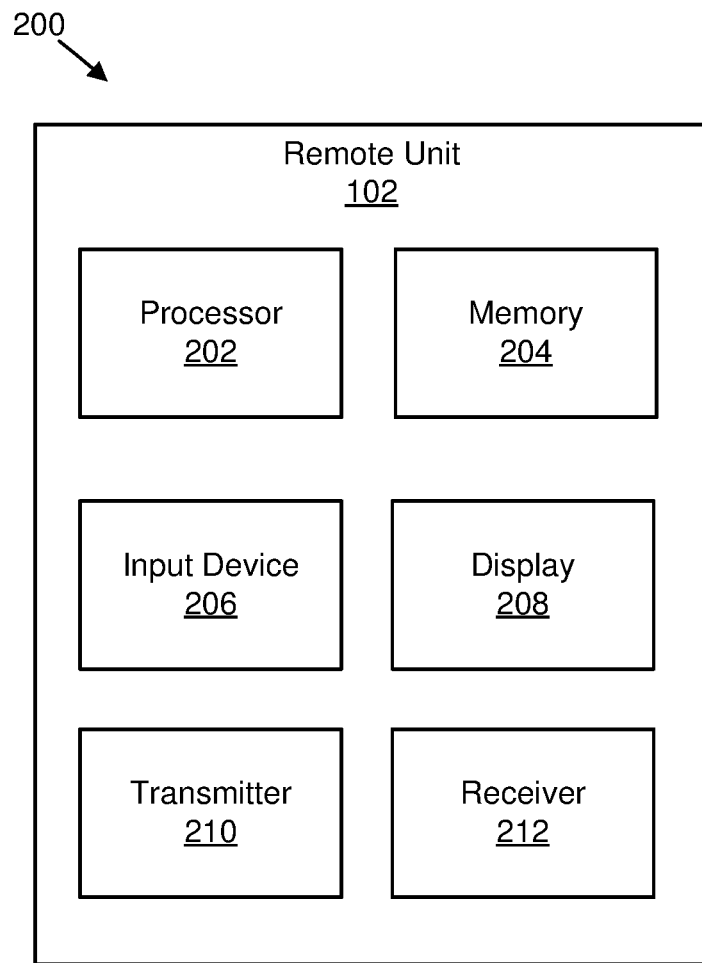
FIG. 2 is a schematic block diagram illustrating one embodiment of an apparatus that may be used for determining data available for transmission.

FIG. 2 depicts one embodiment of an apparatus 200 that may be used for determining data available for transmission. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may: associates a packet data convergence protocol entity with a first radio link control entity and a second radio link control entity belonging to two different cell groups; determine an amount of data available for transmission, the amount of data available for transmission including packet data convergence protocol data and radio link control data pending for initial transmission in the first radio link control entity and the second radio link control entity; compare the amount of data available for transmission with a threshold; and submit the packet data convergence protocol data to a first radio link control entity in response to the amount of data available for transmission being below the threshold. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
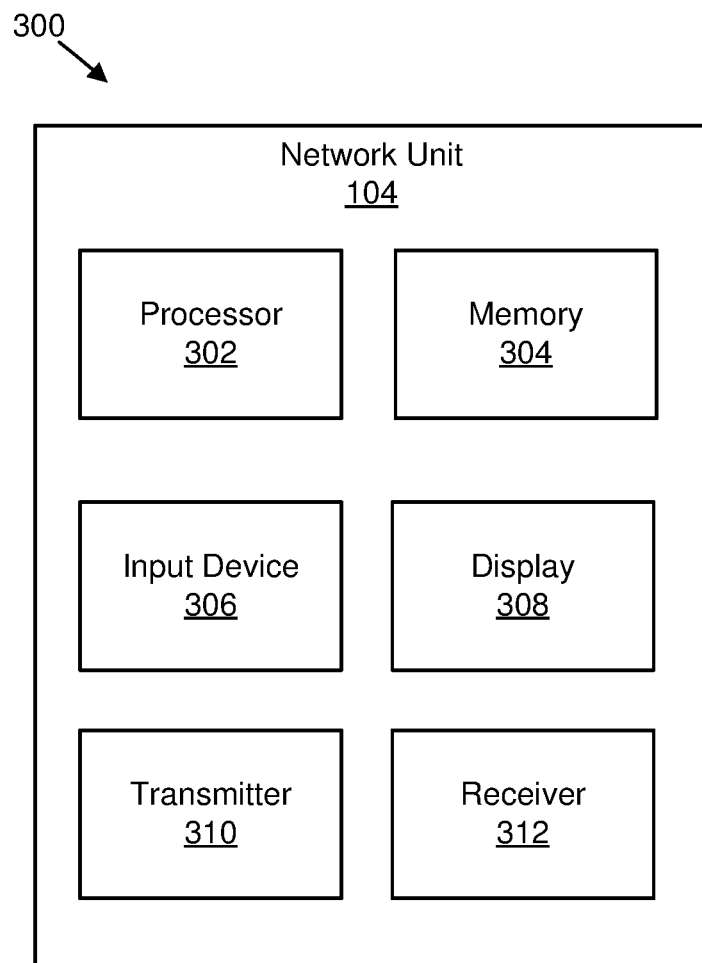
FIG. 3 is a schematic block diagram illustrating one embodiment of an apparatus that may be used for determining data available for transmission.

FIG. 3 depicts one embodiment of an apparatus 300 that may be used for determining data available for transmission. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In the LTE RLC protocol, concatenation may be supported in an RLC layer (e.g., one RLC PDU may include one or more RLC SDUs and/or one or more segments of RLC SDUs). RLC concatenation is performed based on input from a MAC layer (e.g., upon reception of an UL grant and performing the LCP procedure, MAC indicates the size of an RLC PDU to the corresponding RLC layer, which in turn performs the concatenation i.e., RLC PDU construction). Therefore, in LTE neither the RLC layer, nor the MAC layer can do any preprocessing before an UL grant is received. Thus, RLC layer and/or MAC layer processing is subject to real-time processing (e.g., by the remote unit 102). To accommodate a high data rate and a low latency as targeted by 5G/NR systems, a processing time available for a transmitter and/or a receiver may be limited in comparison to an amount of data available for transmission. In certain embodiments, L2 protocol functions may be simplified and designed in a processing power friendly way in order to achieve such high target data rates and low latencies. Therefore, in some embodiments, no concatenation is supported in an RLC layer to enable the preprocessing of the RLC layer and/or the MAC layer before receiving an UL grant (e.g., PDCP SDU can be pre-constructed to a MAC SDU with its own MAC sub-header).

In certain embodiments, such as for a non-split bearer (e.g., a PDCP entity is associated with one RLC entity) a remote unit 102 may forward PDCP SDUs to lower layers and further process them, i.e., generate RLC PDUs/MAC SDUs, directly in response to PDCP SDUs being received by an upper layer. However, in an UL split bearer case (e.g., a radio bearer in a dual connectivity scenario whose radio protocols belong to both Master Cell Group and Secondary Cell Group—the PDCP entity of the split bearer is associated with two RLC entities belonging to two different cell groups) forwarding PDCP SDUs directly to lower layers for the purpose of preprocessing may require a PDCP entity to know to which cell group (MCG or SCG) the PDCP SDUs are to be transmitted before the UL grant is received, which is not possible. Therefore, preprocessing may not be straightforward for dual connectivity configurations (e.g., NR-NR Dual connectivity and LTE-NR Dual connectivity conditions) in which UL split bearer operation is applied. The reason why the PDCP entity in the remote unit 102 may not know to which network unit 104 data will be transmitted before an UL grant reception is that in response to a PDCP Buffer occupancy (e.g., the data available for transmission in PDCP) being above or equal to a configured threshold (e.g., if ul-DataSplitThreshold is configured and the data available for transmission in PDCP is larger than or equal to ul-DataSplitThreshold), the remote unit 102 may report to all associated network units 104 the same PDCP data amount for the purpose of buffer status reporting (e.g., the remote unit 102 indicates the data available for transmission in PDCP to both a MAC entity configured for SCG and a MAC entity configured for MCG). In such a condition in which the data available for transmission in PDCP is larger than and equal to the threshold, transmission may take place according to received uplink grants (e.g., the remote unit 102 submits the PDCP PDUs to either an associated AM RLC entity configured for SCG or an associated AM RLC entity configured for MCG, whichever the PDUs were requested by). Since the remote unit 102 may not know from which network unit 104 an UL grant will be received preprocessing of PDCP, RLC, and/or MAC headers may not be possible in the same way as for the non-split bearer case. Further details of the UE behavior for UL split bearer operation standardized in Rel.13 can be found in TS36.323, i.e. when the data available for transmission in PDCP is less than the configured threshold, the PDCP entity of the remote unit submits the PDCP data only to one of the associated RLC entities—it is configured by Radio Resource Configuration ("RRC") signaling to which of the two RLC entities PDCP data is submitted—and also PDCP entity indicates the data available for transmission in PDCP only to the MAC entity associated with the configured RLC entity for the purpose of buffer status reporting.

In various embodiments, a remote unit 102 may route PDCP PDUs to an associated RLC layer for preprocessing (e.g., RLC PDU may be constructed without notification from a lower layer i.e., a MAC) of a transmission opportunity, thereby reducing an amount of PDCP data. When submitting PDCP PDUs to RLC layer(s) for the purpose of preprocessing—submission of PDCP data to RLC entities is done before an UL grant has been received—in case of an UL split bearer the amount of data available for transmission in PDCP may be always below a threshold, i.e. ul-DataSplitThreshold, because of PDCP data being routed immediately to RLC layer. Since the PDCP entity of the remote unit 102 determines based on the outcome of the data comparison against the threshold whether to route the PDCP data to only one RLC entity and to indicate the PDCP data to only one MAC entity for the purpose of buffer status reporting or to both, it may happen that only one cell group (MCG or SCG) is used for UL transmissions of PDCP data. In some embodiments, an RLC layer may send a request to a PDCP layer to request that the PDCP layer provide PDCP PDUs for the purpose of preprocessing.

In certain embodiments, for the comparison against a configured threshold in PDCP for the purpose of routing PDCP PDUs to RLC entities associated with the PDCP entity and correspondingly for the buffer status reporting as described herein, the remote unit 102 may consider preprocessed data in the RLC entities associated with the PDCP entity (e.g., RLC PDUs which are pending for initial transmission). In some embodiments, the remote unit 102 may consider the following as data available for transmission in the PDCP layer: for SDUs for which no PDU has been submitted to lower layers: the SDU itself, if the SDU has not yet been processed by PDCP; and/or the PDU if the SDU has been processed by PDCP.

In various embodiments, the remote unit 102 may compare a buffer occupancy against a threshold (e.g., ul-DataSplitThreshold) for UL split bearer operation. In such embodiments, in addition to the PDCP buffer occupancy (e.g., amount of PDCP data which is in the PDCP entity and/or buffer available for transmission) also the PDCP PDUs which have been submitted to lower layers (e.g., the associated RLC entities) for the purpose of preprocessing may be combined for comparison against the threshold. In some embodiments, PDCP PDUs which have been submitted to lower layers for preprocessing may be defined as RLC PDUs which are pending for initial transmission. In such embodiments, the remote unit 102 submits the PDCP PDUs to either the associated RLC entity configured for SCG or the associated RLC entity configured for MCG, in response to the combined PDCP buffer occupancy and the RLC data in the associated RLC entities pending for initial transmission being above or equal to a configured threshold. The remote unit 102 indicates the data available for transmission in PDCP to both the MAC entities configured for SCG and the MAC entity configured for MCG when the combined PDCP buffer occupancy and the RLC data in the associated RLC entities pending for initial transmission is above or equal to a configured threshold. Correspondingly, in response to the combined PDCP buffer occupancy and the RLC data in the associated RLC entities pending for initial transmission being less than the configured threshold, the PDCP entity of the remote unit 102 submits the PDCP data only to one of the associated RLC entities—it is configured by Radio Resource Configuration (RRC) signaling to which of the two RLC entities PDCP data is submitted—and also PDCP entity indicates the data available for transmission in PDCP only to the MAC entity associated with the configured RLC entity for the purpose of buffer status reporting.

In certain embodiments, an amount of RLC data PDUs (or segments of RLC data PDUs) pending for retransmission for an RLC AM mode may be considered for comparison against the threshold. As may be appreciated, because RLC retransmissions may be prioritized over newly generated RLC PDUs, RLC PDUs (or portions of RLC PDUs) which are waiting for a retransmission may be transmitted in a next uplink transmission. In such embodiments, because RLC retransmission PDUs may be already generated, there may not be an issue with processing timing for the RLC retransmission PDUs. In various embodiments, the remote unit 102 may, for the purpose of comparison against a threshold in PDCP for UL split bearer operation and in addition to the amount of PDCP data which is in the PDCP entity, also consider PDCP PDUs which have been submitted to lower layers for the purpose of preprocessing (e.g., RLC PDUs pending for initial transmission and/or RLC PDUs which are pending for retransmission).

Figure 4:
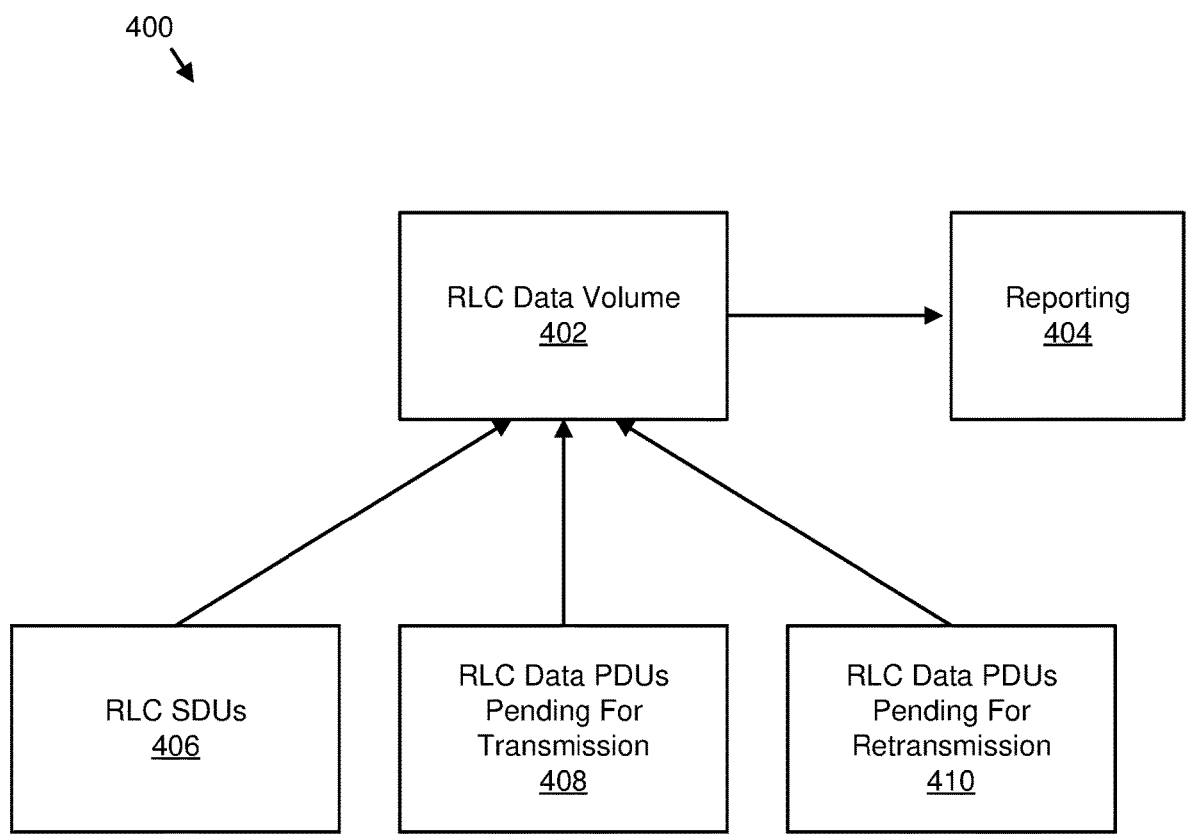
FIG. 4 is a schematic block diagram illustrating one embodiment of buffer status reporting.

In some embodiments, as illustrated in a buffer status reporting 400 of FIG. 4, the remote unit 102 may calculate an RLC data volume 402 (e.g., data volume in an RLC layer) for the purpose of MAC buffer status reporting 404. In certain embodiments, the RLC data volume 402 may include preprocessed RLC data (e.g., RLC data PDUs pending for initial transmission). Specifically, in various embodiments, for the purpose of MAC buffer status reporting 404, the remote unit 102 may calculate the RLC data volume 402 available for transmission in an RLC layer to include: RLC SDUs 406 (or segments thereof) that have not yet been included in an RLC data PDU; RLC data PDUs that are pending for transmission 408; and/or RLC data PDUs (or portions thereof) that are retransmission 410 (e.g., RLC AM). As used herein, a part of an RLC SDU and/or a part of an RLC PDU may be referred to as a part, a portion, a segment, etc.

In some embodiments, the remote unit 102 may be configured for dual connectivity (e.g., the remote unit 102 is connected to two network entities like base stations in which both of the base stations are NR based, i.e., both network entities are gNBs). In such embodiments, the remote unit 102 may be configured with an uplink split bearer.

Figure 5:
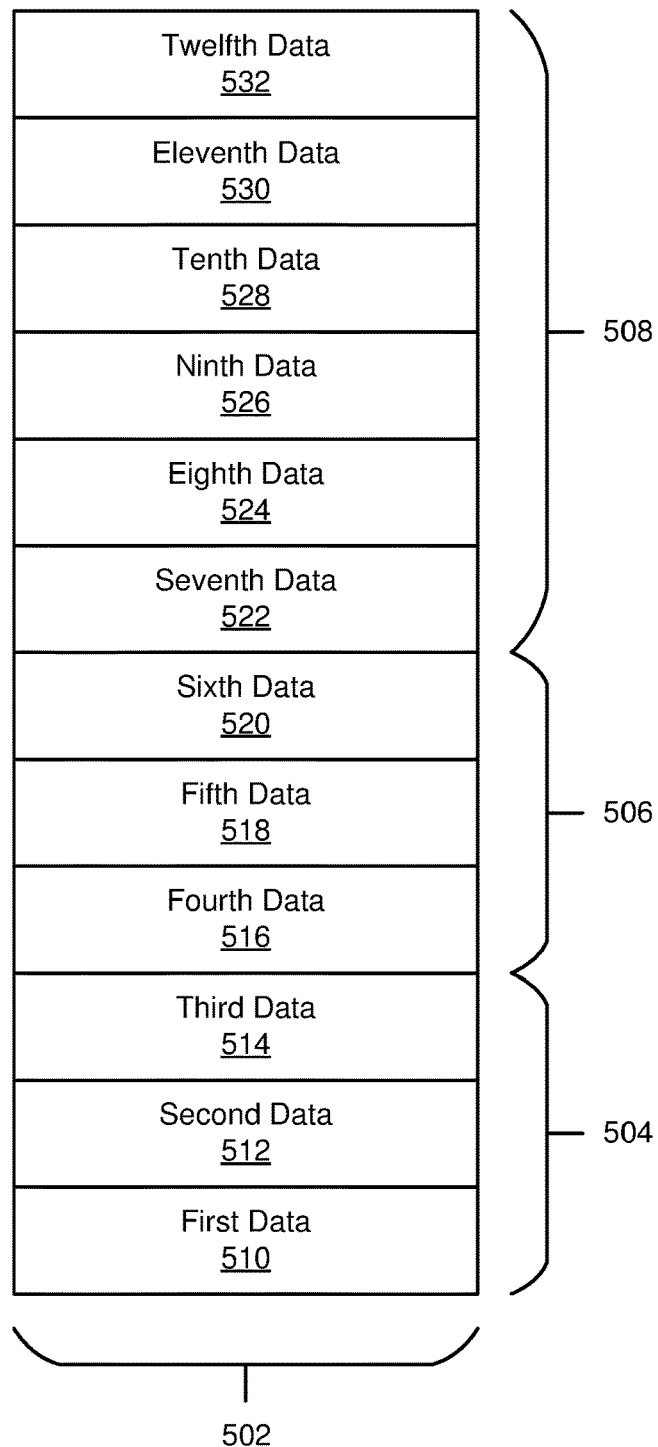
FIG. 5 is a schematic block diagram illustrating one embodiment of data splitting.

FIG. 5 is a schematic block diagram illustrating one embodiment of data splitting 500. In various embodiments, two thresholds may be defined for data 502 in a PDCP layer for an UL split bearer operation (e.g., one for each cell group). In such embodiments, the amount of PDCP data (e.g., PDCP data stored in a PDCP layer and/or buffer) plus the amount of preprocessed data of the prioritized RLC entity may be compared against a first threshold in PDCP. In certain embodiments, PDCP starts routing PDCP PDUs first to a prioritized cell group respectively to a RLC entity belonging to the prioritized cell group. In such embodiments, routing is done until the configured first threshold is reached. A first portion 504 of the data 502 is a quantity of the data 502 group that is up to the first threshold. In various embodiments, the amount of preprocessed data in the prioritized RLC entity (e.g., RLC data pending for initial transmission) shall not exceed the configured first threshold. If there is remaining data in the PDCP layer, the PDCP routes PDCP PDUs to the other non-prioritized CG respectively to the RLC entity belonging to the non-prioritized cell group up to a second configured threshold such that the amount of preprocessed data in the non-prioritized RLC layer (e.g., RLC data pending initial transmission) does not exceed the second configured threshold. A second portion 506 of the data 502 is a quantity of the data 502 group that is greater than the first threshold and less than the second threshold. In certain embodiments, if there is any remaining data in the PDCP layer, the PDCP routes PDCP PDUs to either the associated RLC entity configured for SCG or the associated RLC entity configured for MCG, whichever the PDUs were requested by (e.g., remaining PDCP data is routed according to received uplink grants). A third portion 508 of the data 502 is a quantity of the data 502 group that is greater than the second threshold. In the illustrated embodiment, the first portion 502 includes first data 510, second data 512, and third data 514. Moreover, the second portion 504 includes fourth data 516, fifth data 518, and sixth data 520. Furthermore, the third portion 506 includes seventh data 522, eighth data 524, ninth data 526, tenth data 528, eleventh data 530, and twelfth data 532.

In some embodiments, RLC entities associated with a PDCP entity (e.g., MCG RLC and/or SCG RLC) request from a PDCP layer PDCP PDUs for the purpose of preprocessing in conditions in which an amount of preprocessed RLC data/PDUs is below a configured threshold (e.g., upon having performed some UL transmission). In conditions in which there is data in a PDCP layer and/or buffer, the PDCP layer may first route PDCP PDUs to a prioritized RLC respectively prioritized cell group and then to a non-prioritized RLC respectively non-prioritized cell group as described herein. In conditions in which a PDCP buffer is empty and new data arrives at the PDCP from an upper layer, the PDCP may route PDCP data to corresponding RLC entities as described herein (e.g., starting with a prioritized CG/RLC up to a first threshold and then routing PDCP PDUs to a non-prioritized CG/RLC up to a second configured threshold).

FIG. 6 is a schematic block diagram illustrating one embodiment of PDCP buffering 600. The buffering 600 illustrated in FIG. 6 shows one embodiment of an UL split bearer operation. With the illustrated buffering 600: ul-DataSplitDRB-ViaSCG is set to False (e.g., MCG is the prioritized CG); Threshold1 (for $RLC_{MCG}$) is set to 100 units; and Threshold2 (for $RLC_{SCG}$) is set to 50 units.

In the illustrated embodiment, the PDCP buffer, $RLC_{MCG}$, and $RLC_{SCG}$ are initialized. Then, 100 units of data arrive in the PDCP buffer from which the 100 units are routed to $RLC_{MCG}$. Thereafter, 50 units of data arrive in the PDCP buffer from which the 50 units are routed to $RLC_{SCG}$. An UL grant is then received at the remote unit 102 for the MCG for 80 units so 80 units are transmitted from $RLC_{MCG}$. Then, an UL grant is then received at the remote unit 102 for the SCG for 50 units so 50 units are transmitted from $RLC_{SCG}$. Next, 100 units of data arrive in the PDCP buffer from which 80 units are routed to $RLC_{MCG}$ and 20 units are routed to $RLC_{SCG}$. Thereafter, 500 units of data arrive in the PDCP buffer from which 30 units are routed to $RLC_{SCG}$.

In response to PDCP repeatedly routing PDCP data exclusively reserved for a prioritized CG and a non-prioritized CG (e.g., up to threshold1 and threshold2) to the corresponding RLC entities, the PDCP buffer and/or layer may only hold data which is to be distributed and/or routed according to received UL grants.

In some embodiments, the threshold1 (e.g., threshold configured for the prioritized cell group respectively RLC) configured for an UL split bearer may be the same as the ul-DataSplitThreshold. In various embodiments, a MAC buffer status of a split bearer for a CG (e.g., MCG and SCG) may include PDCP data not delivered to lower layers (e.g., PDCP data in the PDCP layer and/or buffer) plus preprocessed RLC data, RLC data pending for retransmission, RLC SDUs stored in an RLC layer, and/or RLC control PDUs (e.g., RLC status report).

In certain embodiments, a remote unit 102 is configured for dual connectivity (e.g., the remote unit 102 is connected to two network entities such as base stations in which one of the cell groups and/or network entities is LTE based and the other cell group and/or network entity is NR based). In such embodiments, the remote unit 102 may be configured with an uplink split bearer. In some embodiments, a remote unit 102 is configured with at least one threshold for the cell group and/or link which is based on NR to facilitate preprocessing. In various embodiments, an amount of PDCP data plus an amount of preprocessed data of an NR RLC entity is compared to a threshold configured in PDCP for the purpose of PDCP data routing and buffer status reporting as described herein. In configurations in which the NR CG respectively NR RLC entity is a prioritized CG, the PDCP may start routing PDCP PDUs to the NR CG/RLC entity. As may be appreciated, routing may be performed up to a configured threshold (e.g., maximum amount of data). In certain embodiments, an amount of preprocessed data in RLC (e.g., RLC data pending for initial transmission) may not exceed a configured threshold. In configurations in which an LTE based CG/RLC is a prioritized CG/RLC, a remote unit 102 may be configured with a threshold for non-prioritized CG.

In one embodiment, a remote unit 102 behavior in a PDCP layer may be described as follows: "For split bearers, routing is performed in the transmitting PDCP entity, and reordering is performed in the receiving PDCP entity; if ul-DataSplitDRB-ViaSCG is set to TRUE by upper layers: Submit PDCP PDUs to RLC entity configured for SCG until the amount of RLC PDUs pending for initial transmission is equal to threshold1; Submit PDCP PDUs to RLC entity configured for MCG until the amount of RLC PDUs pending for initial transmission is equal to threshold2; else Submit PDCP PDUs to RLC entity configured for MCG until the amount of RLC PDUs pending for initial transmission is equal to threshold1; Submit PDCP PDUs to RLC entity configured for SCG until the amount of RLC PDUs pending for initial transmission is equal to threshold2. When requested by lower layers to submit PDCP PDUs, the transmitting PDCP entity shall: submit the PDCP PDUs to either the associated RLC entity configured for SCG or the associated RLC entity configured for MCG, whichever the PDUs were requested by."

In one embodiment, a remote unit 102 may be configured for dual connectivity (e.g., the remote unit 102 may be connected to two network entities like base stations in which both of the cell groups and/or base stations are NR based, i.e., both network entities are gNBs). In such an embodiment, the remote unit 102 may be configured with an uplink split bearer.

In certain embodiments, a remote unit 102 compares an amount of preprocessed data in RLC entities against preconfigured thresholds. In various embodiments, each RLC entity has a configured maximum amount of preprocessed RLC data. In such embodiments, preprocessed data in RLC may include RLC data PDUs pending for transmission. Moreover, one RLC entity may be configured as a prioritized RLC entity, or respectively one cell group may be configured as a prioritized cell group. In some embodiments, a remote unit 102 may compare an amount of preprocessed data in a prioritized RLC entity with a configured threshold. In such embodiments, if the amount of preprocessed data in the prioritized RLC entity and/or cell group is below the configured threshold (e.g., maximum amount of preprocessed data) the RLC entity may request PDCP PDUs for preprocessing up to the configured threshold (assuming there is sufficient PDCP data in the PDCP layer). Next the remote unit 102 may compare the amount of preprocessed data in the other (e.g., non-prioritized) RLC entity against a corresponding configured threshold. In configurations in which the amount of preprocessed data in the RLC entity is below the configured threshold the RLC entity may request PDCP PDUs up to the configured threshold.

In certain embodiments, a remote unit 102 may be configured with a split bearer for UL transmission. In conditions in which the split bearer is reconfigured to a non-split bearer (e.g., MCG bearer or SCG bearer), the MAC layer may trigger a MAC buffer status report (e.g., in conditions in which a split bearer is reconfigured to MCG bearer the MAC entity for MCG may trigger a buffer status report, in conditions in which a split bearer is reconfigured to SCG bearer the MAC entity for SCG may trigger a buffer status report). In some embodiments, because a remote unit 102 may perform retransmission of all the PDCP PDUs previously submitted to an RLC entity which is re-established and/or removed due to a bearer reconfiguration from a first PDCP PDU for which successful delivery has not been confirmed by lower layers, a buffer status of a PDCP layer may change. In various embodiments, due to preprocessing there may be a larger number of RLC PDUs in an RLC entity which may be removed due to bearer reconfiguration and, therefore, a larger number of PDCP PDUs may be retransmitted via a remaining CG and/or link. In certain embodiments, in response to a remote unit 102 triggering a buffer status report, a network unit 104 may be made aware of an amount of data subject to retransmission due to bearer reconfiguration.

Various embodiments may use fast switching of cell groups and/or transmission legs. In certain embodiments, as an alternative to an UL split bearer operation is to use one CG and/or link at a time for UL data transmission and dynamically switch the link depending on factors such as channel status, traffic load, etc.

In certain embodiments, a remote unit 102 may be configured with a split bearer. In such embodiments, a network entity (e.g., gNB) may configure which of two legs and/or links the remote unit 102 may use for UL transmission of one or more PDCP PDUs. In some embodiments, the configuration is done using a PDCP control PDU. In such embodiments, the PDCP control PDU includes a Boolean variable that indicates whether a secondary cell group/secondary link and/or SCG RLC is used for UL transmission of PDCP PDUs. In various embodiments, a Boolean variable indicates whether a master cell group/master link and/or MCG RLC is used for transmission of PDCP PDUs in an UL transmission.

In some embodiments, MAC control elements ("CEs") may be used to indicate which of two cell groups/links is used for UL transmission of one or more PDCP PDUs. In certain embodiments, a MAC CE includes an LCD of a logical channel that a remote unit 102 uses for UL transmission of PDCP PDUs. In various embodiments, a MAC CE may indicate a cell group used for uplink PDCP PDU transmission (e.g., MCG or SCG).

In some embodiments, upon reception of control signaling indicating a link switch, a remote unit 102 may route all PDCP PDUs to an RLC entity and/or logical channel of an indicated link. In various embodiments, an RLC entity of a leg and/or link used before a signaled link switch may indicate to a PDCP entity RLC SDUs not yet acknowledged (e.g., by an RLC status report). In certain embodiments, a remote unit 102 retransmits not yet acknowledged RLC SDUs via a new link used for UL data transmission (e.g., link indicated in PDCP control PDU or MAC CE).

In some embodiments, a remote unit 102 flushes an RLC transmission buffer and resets the RLC transmission state variables. In one embodiment, an RLC entity of a deactivated link (e.g., link previously used for uplink data transmission) is reestablished.

In certain embodiments, a network entity sends a PDCP status report for a split bearer together with an indication to configure and/or switch a link for UL PDCP PDU transmission. In various embodiments, a remote unit 102, upon reception of a PDCP status report, retransmits PDCP SDUs not yet acknowledged by a network entity via a link and/or leg indicated to be used for uplink data transmission. In some embodiments, a remote unit 102 flushes an RLC transmission buffer and resets the RLC transmission state variables of a leg which is not used for UL data transmission. In certain embodiments, an RLC entity of a deactivated link is reestablished.

In some embodiments, a default leg and/or link is used for UL data (e.g., PDCP PDU) transmission upon configuration of a split bearer. In certain embodiments, a remote unit 102 uses a default leg for UL data transmissions until a network entity signals a "link switch" by means of some control signaling.

Figure 7:
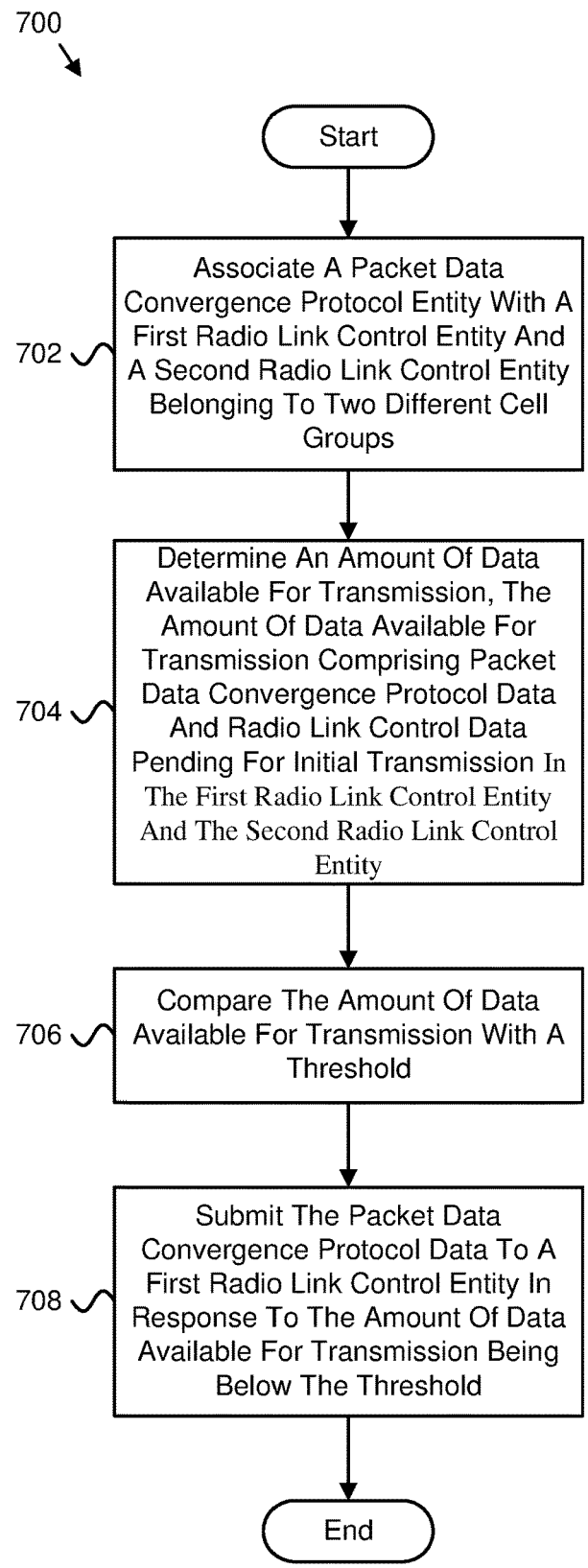
FIG. 7 is a schematic flow chart diagram illustrating one embodiment of a method for determining data available for transmission.

FIG. 7 is a schematic flow chart diagram illustrating one embodiment of a method 700 for determining data available for transmission. In some embodiments, the method 700 is performed by an apparatus, such as the remote unit 102 or the network unit 104. In certain embodiments, the method 700 may be performed by a processor executing program code, for example, a microcontroller, a microprocessor, a CPU, a GPU, an auxiliary processing unit, a FPGA, or the like.

The method 700 may include associating 702 a packet data convergence protocol entity with a first radio link control entity and a second radio link control entity belonging to two different cell groups. The method 700 may include determining 704 an amount of data available for transmission. In certain embodiments, the amount of data available for transmission may include packet data convergence protocol data and radio link control data pending for initial transmission in the first radio link control entity and the second radio link control entity. In various embodiments, the method 700 includes comparing 706 the amount of data available for transmission with a threshold. In some embodiments, the method 700 includes submitting 708 the packet data convergence protocol data to a first radio link control entity in response to the amount of data available for transmission being below the threshold.

In one embodiment, the first radio link control entity is configured by radio resource control signaling. In a further embodiment, the method 700 includes indicating an amount of packet data convergence protocol data to a medium access control entity associated with the first radio link control entity for buffer status reporting in response to the amount of data available for transmission being below the threshold. In certain embodiments, the packet data convergence protocol data includes data stored in a packet data convergence protocol layer. In various embodiments, the method 700 includes indicating zero to a medium access control entity associated with a second radio link control entity as the amount of packet data convergence protocol data for buffer status reporting in response to the amount of data available for transmission being below the threshold. In some embodiments, the method 700 includes submitting the packet data convergence protocol data to either the first radio link control entity or a second radio link control entity in response to the amount of data available for transmission being greater than or equal to the threshold. In certain embodiments, the method 700 includes indicating the packet data convergence protocol data to a medium access control entity associated with the first radio link control entity and to a medium access control entity associated with a second radio link control entity for buffer status reporting in response to the amount of data available for transmission being greater than or equal to the threshold.

In various embodiments, the method 700 includes receiving at least one uplink grant. In some embodiments, the method 700 includes, in response to receiving the at least one uplink grant, transmitting data to at least one base unit that transmitted the at least one uplink grant. In certain embodiments, the at least one uplink grant includes one uplink grant and the at least one base unit includes one base unit. In various embodiments, the at least one uplink grant includes two uplink grants and the at least one base unit includes two base units. In certain embodiments, the threshold includes a first threshold and a second threshold. In various embodiments, the first threshold corresponds to prioritized data. In some embodiments, the second threshold corresponds to non-prioritized data.

In certain embodiments, the method 700 includes receiving a configuration message indicating the first radio link control entity associated with a first base unit of multiple radio link control entities associated with multiple base units to use for uplink transmissions. In various embodiments, the method 700 includes receiving a reconfiguration message indicating to switch from using the first radio link control entity for uplink transmissions corresponding to the first base unit to use a second radio link control entity of the multiple radio link control entities for uplink transmissions corresponding to a second base unit. In various embodiments, the method 700 includes, in response to receiving the reconfiguration message, performing a reestablishment of the first radio link control entity. In some embodiments, the method 700 includes, in response to receiving the reconfiguration message, flushing a transmission buffer corresponding to the first radio link control entity and resetting transmission state variables corresponding to the first base unit. In certain embodiments, the method 700 includes using a first base unit of multiple base units as a default base unit for uplink transmissions. In various embodiments, the method 700 includes receiving a switch message indicating to switch from using the first base unit for uplink transmissions to use a second base unit of the multiple base units for uplink transmissions.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
  associating a packet data convergence protocol entity with a first radio link control entity and a second radio link control entity belonging to two different cell groups;
  determining to submit a packet data convergence protocol data unit from the packet data convergence protocol entity to one of the first radio link control entity and the second radio link control entity;
  calculating a value indicating an amount of data available for transmission, wherein the value indicating the amount of data available for transmission comprises a sum of a data volume in the packet data convergence protocol entity and a radio link control data volume pending for initial transmission in the first radio link control entity and the second radio link control entity;
  comparing the value indicating the amount of data available for transmission with a threshold; and
  submitting the packet data convergence protocol data unit to the first radio link control entity in response to the value indicating the amount of data available for transmission being below the threshold.

2. The method of claim 1, wherein the first radio link control entity is configured by radio resource control signaling.

3. The method of claim 1, further comprising determining to report a buffer status and indicating an amount of packet data convergence protocol data volume to a medium access control entity associated with the first radio link control entity for buffer status reporting in response to the value indicating the amount of data available for transmission being below the threshold.

4. The method of claim 3, wherein the packet data convergence protocol data volume comprises a total amount of data in a packet data convergence protocol layer.

5. The method of claim 3, further comprising determining to report a buffer status and indicating zero to a medium access control entity associated with a second radio link control entity as the amount of packet data convergence protocol data volume for buffer status reporting in response to the value indicating the amount of data available for transmission being below the threshold.

6. The method of claim 1, further comprising submitting the packet data convergence protocol data unit to either the first radio link control entity or a second radio link control entity in response to the value indicating the amount of data available for transmission being greater than or equal to the threshold.

7. The method of claim 1, further comprising indicating the packet data convergence protocol data to a medium access control entity associated with the first radio link control entity and to a medium access control entity associated with a second radio link control entity for buffer status reporting in response to the value indicating the amount of data available for transmission being greater than or equal to the threshold.

8. The method of claim 1, further comprising receiving at least one uplink grant.

9. The method of claim 8, further comprising, in response to receiving the at least one uplink grant, transmitting data to at least one base unit that transmitted the at least one uplink grant.

10. The method of claim 9, wherein the at least one uplink grant comprises only one uplink grant and the at least one base unit comprises only one base unit.

11. The method of claim 9, wherein the at least one uplink grant comprises two uplink grants and the at least one base unit comprises two base units.

12. The method of claim 1, wherein the threshold comprises a first threshold and a second threshold, comparing the value indicating the amount of data available for transmission with the threshold comprises comparing the value indicating the amount of data available for transmission with the first threshold, and submitting the packet data convergence protocol data to the first radio link control entity in response to the value indicating the amount of data available for transmission being below the threshold comprises submitting the packet data convergence protocol data to the first radio link control entity in response to the value indicating the amount of data available for transmission being below the first threshold.

13. The method of claim 12, wherein the first threshold corresponds to prioritized data.

14. The method of claim 12, wherein the second threshold corresponds to non-prioritized data.

15. The method of claim 1, further comprising receiving a configuration message indicating the first radio link control entity associated with a first base unit of a plurality of radio link control entities associated with a plurality of base units to use for uplink transmissions.

16. The method of claim 15, further comprising receiving a reconfiguration message indicating to switch from using the first radio link control entity for uplink transmissions corresponding to the first base unit to use a second radio link control entity of the plurality of radio link control entities for uplink transmissions corresponding to a second base unit.

17. The method of claim 16, further comprising, in response to receiving the reconfiguration message, performing a reestablishment of the first radio link control entity.

18. The method of claim 16, further comprising, in response to receiving the reconfiguration message, flushing a transmission buffer corresponding to the first radio link control entity and resetting transmission state variables corresponding to the first base unit.

19. The method of claim 1, further comprising using a first base unit of a plurality of base units as a default base unit for uplink transmissions.

20. The method of claim 19, further comprising receiving a switch message indicating to switch from using the first base unit for uplink transmissions to use a second base unit of the plurality of base units for uplink transmissions.

21. An apparatus comprising:
a processor that:
associates a packet data convergence protocol entity with a first radio link control entity and a second radio link control entity belonging to two different cell groups;
determines to submit a packet data convergence protocol data unit from the packet data convergence protocol entity to one of the first radio link control entity and the second radio link control entity;
calculates a value indicating an amount of data available for transmission, wherein the value indicating the amount of data available for transmission comprises a sum of a data volume in the packet data convergence protocol entity and a radio link control data volume pending for initial transmission in the first radio link control entity and the second radio link control entity;
compares the value indicating the amount of data available for transmission with a threshold; and
submits the packet data convergence protocol data unit to the first radio link control entity in response to the value indicating the amount of data available for transmission being below the threshold.

* * * * *